(12) United States Patent
Medina et al.

(10) Patent No.: US 7,672,300 B1
(45) Date of Patent: Mar. 2, 2010

(54) NETWORK DEVICE WITH MULTIPLE MAC/PHY PORTS

(75) Inventors: Eitan Medina, Ramat Hasharon (IL); Yaniv Kopelman, Holon (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1179 days.

(21) Appl. No.: 10/896,727

(22) Filed: Jul. 22, 2004

(51) Int. Cl.
*H04L 12/50* (2006.01)

(52) U.S. Cl. ........................ 370/366; 370/463

(58) Field of Classification Search ................ 370/366, 370/445–450, 462–463, 535, 538, 546
See application file for complete search history.

(56) References Cited

U.S. PATENT DOCUMENTS

| | | | | |
|---|---|---|---|---|
| 5,896,417 A | * | 4/1999 | Lau | ........................... 375/258 |
| 6,490,281 B1 | * | 12/2002 | Abler et al. | .................. 370/394 |
| 6,529,529 B1 | * | 3/2003 | Tohkairin | .................... 370/537 |
| 7,343,425 B1 | * | 3/2008 | Lo et al. | ...................... 709/246 |
| 7,440,475 B2 | * | 10/2008 | Kubo et al. | ................. 370/535 |
| 2002/0075845 A1 | * | 6/2002 | Mullaney et al. | ............ 370/351 |
| 2005/0036524 A1 | * | 2/2005 | Wojtowicz | .................... 370/537 |
| 2005/0135434 A1 | * | 6/2005 | Choi et al. | ................... 370/537 |

OTHER PUBLICATIONS

IEEE std. 802.3 IEEE Standard for Information technology—Telecommunications and information exchange between systems—Local and metropolitan area networks—Specific requirements; Part 3: Carrier sense multiple access with collison detection (CSMA/DC) access method and physical layer specifications, 2002, pp. 147-249.
U.S. Appl. No. 10/646,601, filed Aug. 21, 2003, William Lo et al.

* cited by examiner

*Primary Examiner*—Kwang B Yao
*Assistant Examiner*—Tung Q Tran

(57) ABSTRACT

A network device comprises a multi-port MAC device that includes N MAC devices and that outputs a port multiplexed and encoded parallel data stream. A first serializer/deserializer (SERDES) serializes the port multiplexed and encoded parallel data stream from the multi-port MAC device.

143 Claims, 7 Drawing Sheets

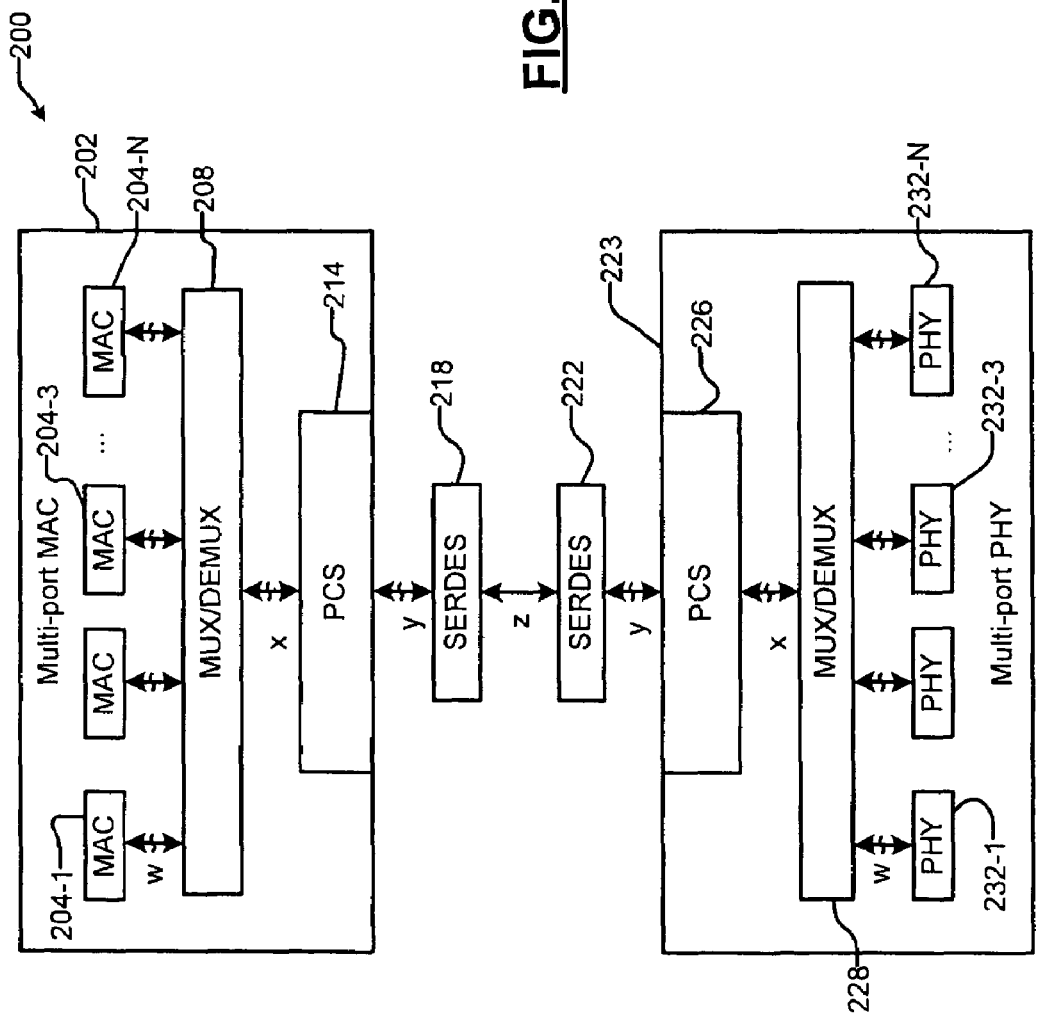

NETWORK DEVICE WITH MULTIPLE MAC/PHY PORTS

CROSS-REFERENCE TO RELATED APPLICATIONS

This application is a related to U.S. patent application Ser. No. 10/646,601 filed on Aug. 21, 2003, which is hereby incorporated by reference in its entirety.

FIELD OF THE INVENTION

The present invention relates to network devices, and more particularly to multi-port network devices.

BACKGROUND OF THE INVENTION

When a network device includes multiple ports, separate links are used to connect physical layer (PHY) devices to corresponding medium access control (MAC) devices for each port. For example, when the network device includes four ports, four PHY and MAC devices are individually connected to each other.

For lower speeds such as 10/100 Mb/s, a medium independent interface (MII) may be used to connect each MAC/PHY pair. Gigabit Ethernet switches use a Gigabit media independent interface (GMII) to connect MAC/PHY pairs. GMII is a parallel interface that includes traces that run simultaneously at a fixed frequency between the paired MAC and PHY devices. The GMII interface works well for Gigabit Ethernet switches with one port or with relatively few ports. When additional ports are added, problems may arise relating to the relatively high number of pins, synchronization, cost and interference.

A reduced GMII (RGMII) decreased the number of pins by increasing the data frequency. The lower number of pins reduced the cost. However, running more energy through each trace increased the likelihood of interference. A serial Gigabit interface was developed using a pair of serializer/deserializers to solve problems associated with the GMII and RGMII parallel interfaces. While parallel connections allow high data rates over short distances, serial links permit longer connections and reduce synchronization issues. Despite having a higher transmit frequency, the serial interference is not as problematic because the signals do not travel in synch. The serial Gigabit interface format also allows SERDES components to be integrated on the same chip.

Referring now to FIG. 1, a network device 10 includes a medium access control (MAC) device 12 with a Gigabit MAC 14 and a physical coding sublayer (PCS) device 16. An output of the MAC device 12 is input to a first SERDES 20, which provides a serial link at a fixed data rate. A second SERDES 22 communicates with the first SERDES 20 and is connected to a PCS 26 of a PHY device 28 that also includes a PHY 30. The MAC device 12 communicates with higher level layers. The PHY 30 communicates with a medium 34. The PCS 16 may perform 8/10 bit encoding as specified by 802.3z, which increases the data rate to 1.25 Gb/s, or other suitable PCS coding may be used. A serial management interface 36 provides control information between the MAC and the PHY. Because the first and second SERDES 20 and 22 must operate at 1.25 Gb/s, a solution was required for MACs 14 that operate at lower data rates such as 10 or 100 Mb/s.

SUMMARY OF THE INVENTION

A network device comprises a multi-port MAC device that includes N MAC ports and that outputs a port multiplexed and encoded parallel data stream. A first serializer/deserializer (SERDES) serializes the port multiplexed and encoded parallel data stream from the multi-port MAC device.

In other features, the multi-port MAC device further comprises a first multiplexer/demultiplexer (MUX/DEMUX) that multiplexes data from and demultiplexes data to the N MAC ports. The multi-port MAC device further comprises a first physical coding sublayer (PCS) device that communicates with the first MUX/DEMUX and the first SERDES and that encodes data from and decodes data to the first MUX/DEMUX.

In yet other features, a second SERDES communicates with the first SERDES. A multi-port physical layer (PHY) device includes N PHY ports and communicates with the second SERDES. The multi-port PHY device includes a second physical coding sublayer (PCS) device that decodes data from and encodes data to the second SERDES. The multi-port PHY device includes a second MUX/DEMUX that communicates with the second PCS device and the N PHY ports and that demultiplexes data from and multiplexes data to the second PCS device.

In yet other features, at least one of the N MAC ports operates at multiple speeds. At least one of the N MAC ports operates at a speed that is different than a speed of at least another of the N MAC ports.

In other features, the multi-port MAC device comprises N speed translators that receive the parallel data stream from respective ones of the N MAC ports and that selectively outputs a speed translated data stream. A first MUX/DEMUX multiplexes data from and demultiplexes data to the N translators. A physical coding sublayer (PCS) device communicates with the first MUX/DEMUX and the first SERDES and encodes the data stream from the first MUX/DEMUX and outputs an encoded data stream to the first SERDES.

In other features, all of the N MAC ports have a nominal speed of operation of one of 10 Mb/s, 100 Mb/s, 1 Gb/s and 10 Gb/s. The N MAC ports selectively operate at least one of 10 Mb/s, 100 Mb/s, 1 Gb/s and 10 Gb/s.

A transmit path of a network device comprises a multi-port MAC device that includes N MAC ports and that outputs a port multiplexed and encoded parallel data stream. A serializer serializes the port multiplexed and encoded parallel data stream from the multi-port MAC device.

A receive path of a network device comprises a multi-port PHY device that includes N PHY ports and that outputs a port multiplexed and encoded parallel data stream. A serializer serializes the port multiplexed and encoded parallel data stream from the multi-port PHY device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a functional block diagram of a first exemplary interface for a network device having multiple MAC/PHY ports that are connected by a single SERDES pair according to the present invention;

DETAILED DESCRIPTION OF THE PREFERRED EMBODIMENTS

Figure 4:
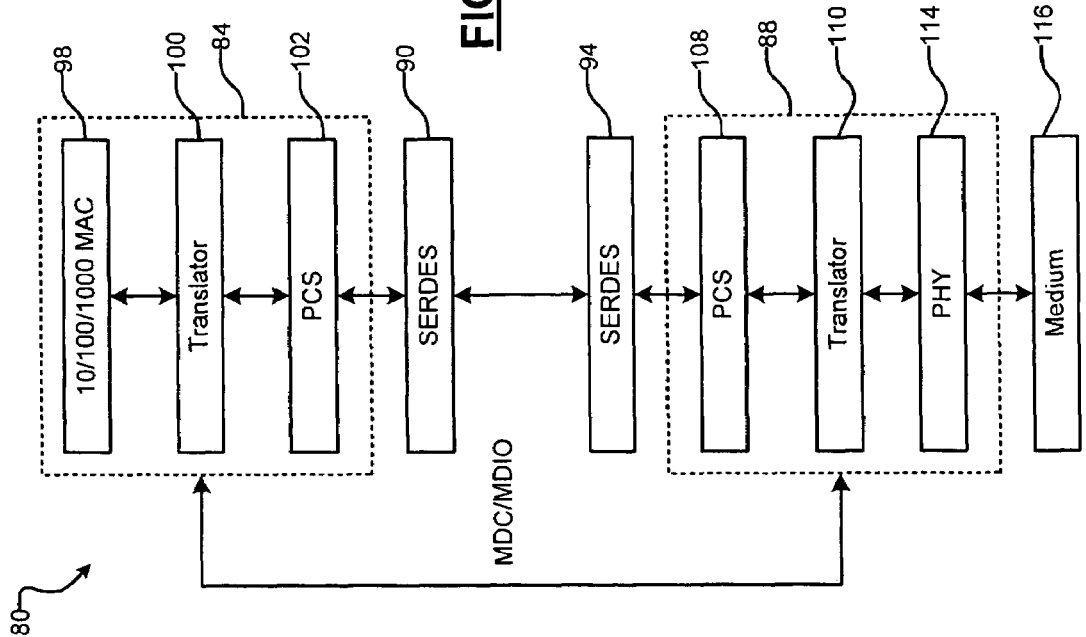
FIG. 4 is a functional block diagram of a network device that includes MAC and PHY devices that operate at multiple speeds and that are connected by a SERDES.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
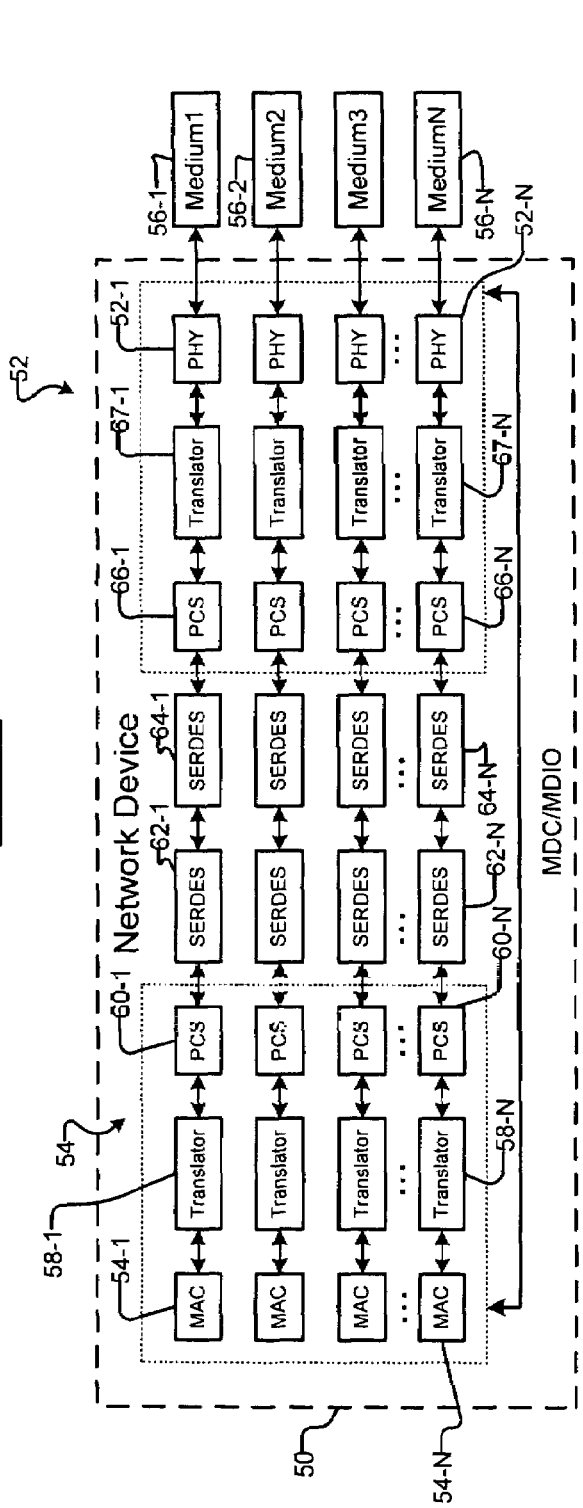
FIG. 2 is a functional block diagram of a network device including multi-port MAC and PHY devices.

Referring now to FIG. 2, an exemplary network device 50 such as switch or a router includes a multi-port PHY device 52 and a multi-port MAC device 54. The PHY devices 52-1, 52-2, 52-3, . . . , and 52-N communicate with mediums 56-1, 56-2, 56-3, . . . , and 56-N, respectively. For example, the medium 56-1 may be 10BASE-T compliant, the medium 56-2 may be 100BASE-TX compliant, and the medium 56-3 may be 1000BASE-T compliant.

The MAC device 54 includes 10/100/1000 MAC devices 54-1, 54-2, . . . , and 54-N, which are connected by speed translators 58-1, 58-2, 58-3, 58-N and physical coding sublayer (PCS) devices 60-1, 60-2, . . . , and 60-N (collectively referred to as PCS devices 60) to SERDES 62-1, 62-2, . . . , and 62-N (collectively referred to as SERDES 62), respectively. The SERDES 62-1, 62-2, . . . , and 62-N communicate with SERDES 64-1, 64-2, . . . , and 64-N (collectively referred to as SERDES 64), respectively, that are associated with the PHY devices 52. The SERDES 64-1, 64-2, . . . , and 64-N are connected by PCS devices 66-1, 66-2, . . . , and 66-N (collectively referred to as PCS devices 66) and speed translators 67-1, 67-2, . . . , 67-N to PHY devices 52-1, 52-2, . . . , and 52-N, respectively.

Figure 3A:
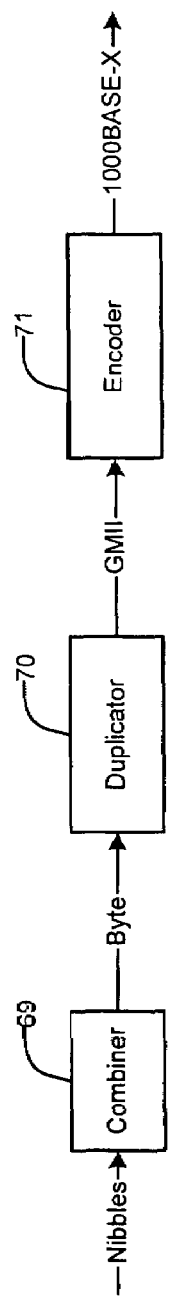
FIGS. 3A and 3B are functional block diagrams multi-port network devices including speed translators.
Figure 3B:
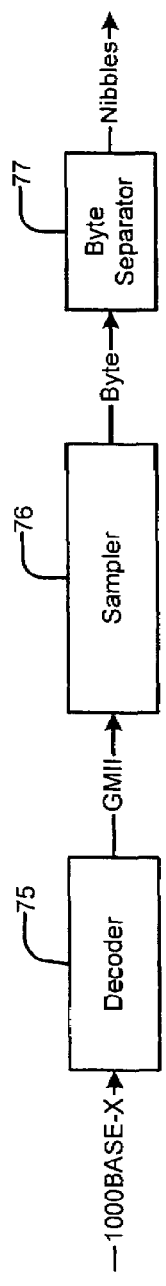

Referring now to FIGS. 2, 3A and 3B, the PHY device 52 and the MAC device 54 operate using the serial Gigabit interface. Control and data bytes are passed serially. Since the data rates can be 10 Mb/s (10BASE-T), 100 Mb/s (100BASE-T) and 1000 Mb/s (1000BASE-T), the 10BASE-T and 100BASE-T rates are adjusted to 1000 Mb/s to provide a common data rate for the SERDES 62 and 64. Therefore, the data translator 58 duplicates the data at 10 Mb/s 100 times and the data at 100 Mb/s 10 times. The reverse process is performed by the speed translator 67. The data at 1000 Mb/s is not altered by the speed translators 58 and 67.

In 10 Mb/s and 100 Mb/s modes, data is typically packaged in nibbles. Prior to replicating the data, a combiner 69 combines two adjacent nibbles into a byte. A byte duplicator 70 duplicates bytes 10 times when receiving 100 Mb/s data streams and 100 times when receiving 10 Mb/s data streams. The output of the duplicator 70 is a Gigabit Media Independent Interface (GMII) data stream that is input to an encoder 71. The encoder 71 may perform 8/10 bit encoding. The encoder 71 receives the bytes from the duplicator 30 and outputs a 1000BASE-X data stream.

Going in the reverse direction, a bit decoder 75 receives the 1000-BASE-X data stream from the SERDES 62. The decoder 75 outputs a GMII data stream to a sampler 76. The sampler 76 samples 1 out of 10 bytes for 100 Mb/s and 1 out of 100 bytes for 10 Mb/s. A byte separator 77 separates the bytes into nibbles. The serial Gigabit interface uses a modified form of 1000BASE-X autonegotiation to pass speed, link, and duplex information.

Referring now to FIG. 4, a network device 80 implements another form of translation and includes a MAC device 84 and a PHY device 88. Additional details can be found in U.S. patent Ser. No. 10/646,601, filed Aug. 21, 2003, which is hereby incorporated by reference in its entirety. The MAC device 84 and the PHY device 88 are connected by SERDES 90 and 94, which operates at a fixed data rate such as 1.25 Gb/s although other data rates can be used. The MAC device 84 and the PHY device 88 are capable of operating at 10 Mb/s, 100 Mb/s, 1000 Mb/s and/or other speeds.

The MAC device 84 includes a 10/100/1000 MAC 98 that communicates with a speed translator 100. The speed translator 100 appends and duplicates data to provide the desired higher data rate. The speed translator 100 outputs translated data to a PCS device 102, which codes the data.

The PHY device 88 includes a PCS 108, which decodes the data that is received from the SERDES 94. A data translator 110 reverses the operation that was performed by the data translator 100 and outputs data to the PHY 114, which communicates with a medium 116. A MDC/MDIO 90 may operate as described in IEEE section 22 of 802.3, which is hereby incorporated by reference in its entirety.

Figure 5A:
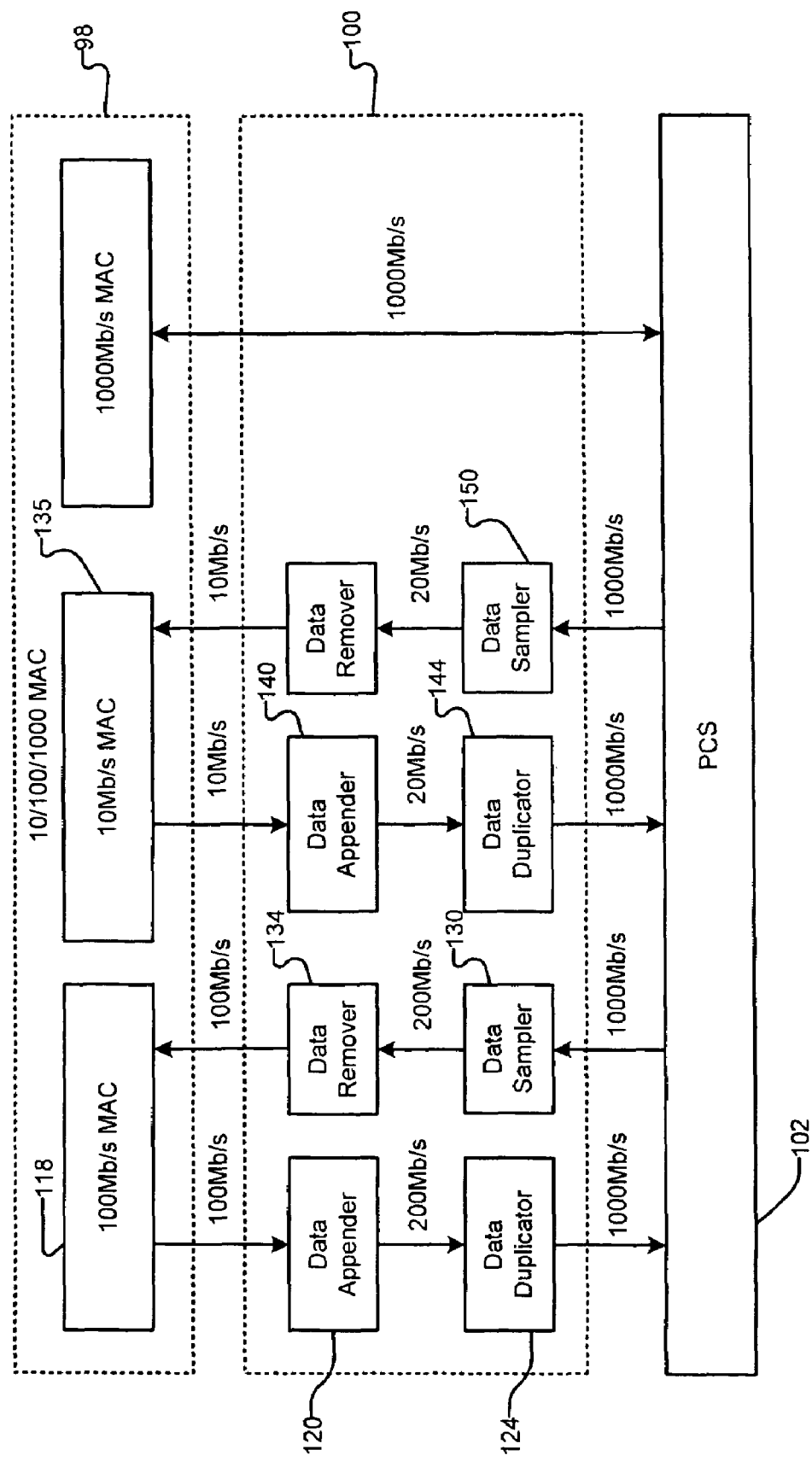
FIGS. 5A and 5B illustrate other types of speed translators in further detail.
Figure 5B:
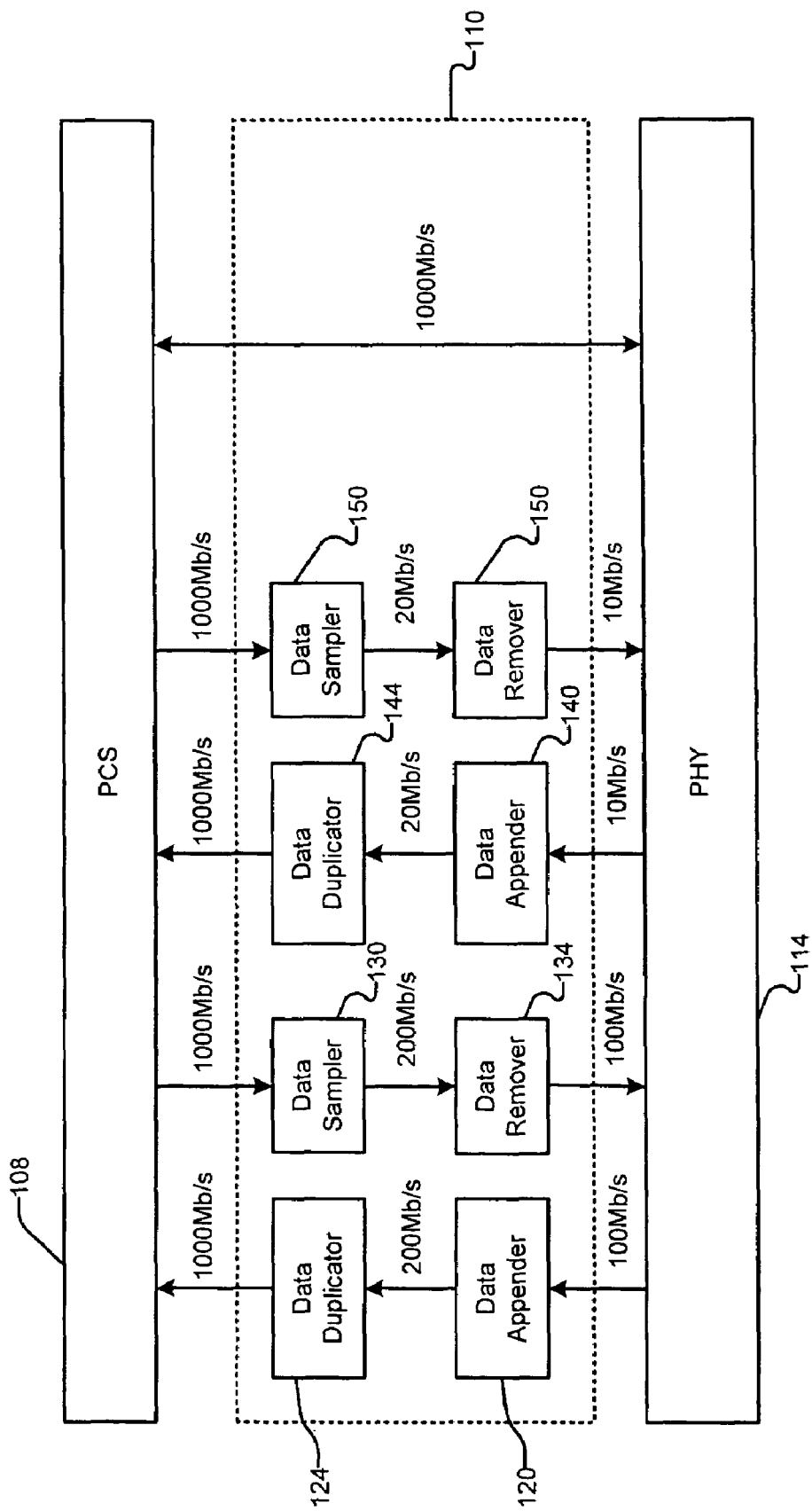

Referring now to FIGS. 5A and 5B, the speed translator 100 is shown in further detail. When the MAC 98 is operating at 1000 Mb/s, the speed translator 100 passes the data (without change) to the PCS 102. When the MAC 98 is operating at 100 Mb/s, the MAC 98 outputs nibbles (4 bits) at a rate of 100 Mb/s. The speed translator 100 includes a data appender 120 that appends 4 additional bits to form a byte, which increases the data rate to 200 Mb/s. Any 4 bit pattern can be used. For example, 0101 can be added to the MSB positions and the nibble can be located in the LSB positions. The 4 appended bits can also be located in the LSB positions, in the middle of the byte, and/or interspersed. The output of the data appender 120 is input to a data duplicator 124. The data duplicator 124 duplicates the bytes five times to generate an output data stream at 1000 Mb/s, which is output to the PCS 102. The PCS 102 encodes the data and outputs the data to the SERDES 90.

Data flowing in the opposite direction from the PCS 102 to the MAC 98 is decoded in an opposite manner. The data sampler 130 samples one of every 5 bytes of the data and outputs data at 200 Mb/s. A data remover 134 removes the appended 4 bits, recovers the nibble and the data rate is reduced to 100 Mb/s.

When the MAC 98 operates at 10 Mb/s (as shown at 135), the MAC 98 sends data to a data appender 140 and a data duplicator 144, which operate in a manner that is similar to the data appender 120 and the data duplicator 124. However, the data duplicator 124 duplicates the data 50 times instead of 5 times. Continuing with the example set forth above, the MAC 98 outputs data at 10 Mb/s to the data appender 140, which appends 4 bits to each received nibble. The data duplicator 144 duplicates the data 50 times. The PCS 102 encodes the data as described above and outputs the encoded data to the SERDES 90. In the opposite direction, a data sampler 150 samples one of every 50 bytes and outputs data at 20 Mb/s. A data remover 154 removes one or more appended bits to recover the nibbles and the data rate is reduced to 10 Mb/s. In FIG. 5B, the translator 110 reverses the steps performed by the translator 100.

Referring now to FIG. 6, a network device 200 according to the present invention is shown to include a multi-port MAC 202 including N MAC devices 204-1, 204-2, . . . and 204-N (collectively MAC devices 204). Outputs of the N MAC devices 204-1, 204-2, . . . and 204-N are multiplexed/demultiplexed by a multiplexer/demultiplexer (MUX/DEMUX) 208. An output of the MUX/DEMUX 208 communicates with a physical coding sublayer (PCS) device 214, which provides coding and decoding for delineation and/or scrambling. The PCS device 214 communicates with a first serializer/deserializer (SERDES) 218, which serializes data from and deserializes data to the PCS device 214.

A second SERDES 222 deserializes/serializes communications from the first SERDES 218 and a multi-port PHY device 223, respectively. The multi-port PHY device 223 includes a PCS device 226 that communicates with a MUX/DEMUX 228, which demultiplexes the data stream from the PCS device 226 and multiplexes a data stream from N PHY devices 232-1, 232-2, . . . and 232-N (collectively PHY devices 232).

In this implementation, all of the MAC and PHY devices 204 and 232, respectively, operate at the same speed. On the transmit path, the MAC devices 204 output a parallel data stream at speed w. The MUX/DEMUX 208 multiplexes the parallel data streams from the MAC devices 204 to generate a multiplexed parallel data stream at speed x=N*w. The PCS device 214 performs coding on the multiplexed data stream and outputs a coded parallel data stream at speed y, where y≧x. The difference between x and y represents coding overhead. The SERDES 218 serializes the coded parallel data stream to generate a serialized data stream at speed z, where z≧N*y.

The SERDES 222 deserializes the serial data stream at speed z to generate the coded parallel data stream at speed y. The PCS device 226 decodes the coded parallel data stream and outputs a decoded data stream at speed x to the MUX/DEMUX 228. The MUX/DEMUX 228 demultiplexes the decoded data stream and outputs a data stream at speed w to the N PHY devices 232, which outputs the data to the medium.

For example, in one implementation, N=4 and w=1 Gb/s. The MUX/DEMUX 208 outputs a parallel data streams at x=4 Gb/s. The PCS device 214 performs 8/10 bit coding and outputs the parallel data stream at y=5 Gb/s. The SERDES 218 outputs a serial data stream at z≧N*y Gb/s. As can be appreciated, higher and lower speeds and other types of PCS coding may be implemented. The coding performed by the PCS devices 214 and 226 may include information identifying the port of the data stream. Alternately, a port delimiter may be used. In another approach, each X-bit word that is to be coded by the PCS can include one or more data bits from each of the ports as will be described further below. For example, eight (or less) ports can be accommodated by an 8/10 bit PCS.

On the receive path, the PHY devices 232 output a parallel data stream at speed w to the MUX/DEMUX 228, which multiplexes the parallel data stream and outputs a multiplexed parallel data stream at speed x. The PCS device 226 encodes the multiplexed parallel data stream and outputs a coded parallel data stream. The SERDES 222 serializes the coded data stream and transmits a serialized data stream at speed z to the SERDES 21.8.

The SERDES 222 deserializes the serialized data stream and outputs the deserialized data stream to the PCS device 214, which decodes the data stream. The MUX/DEMUX 208 demultiplexes the data stream and outputs parallel data streams to the MAC devices 204.

Figure 7A:
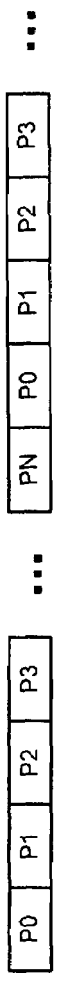
FIGS. 7A, 7B and 7C illustrate multiplexing of port data through the SERDES.
Figure 7B:

Referring now to FIGS. 7A and 7B, the output of the MUX/DEMUX 208 on the transmit path is shown. Data streams P0, P1, . . . PN from the ports of the network device are multiplexed. In FIG. 7B, a port delineator PD may be added between the N port data streams in some implementations. Alternately, the coding performed by the PCS may contain port delineators and the port delineator may be omitted. In other words, one of the reserved PCS symbols may be used as a port delineator.

In FIG. 7B, the ports are not identified by the coding—only the start of the byte stream is identified by a special symbol (i.e. delimiter). Since the byte stream order is fixed (for example, TDM) then the only information needed is the start of stream delimiter.

Figure 7C:
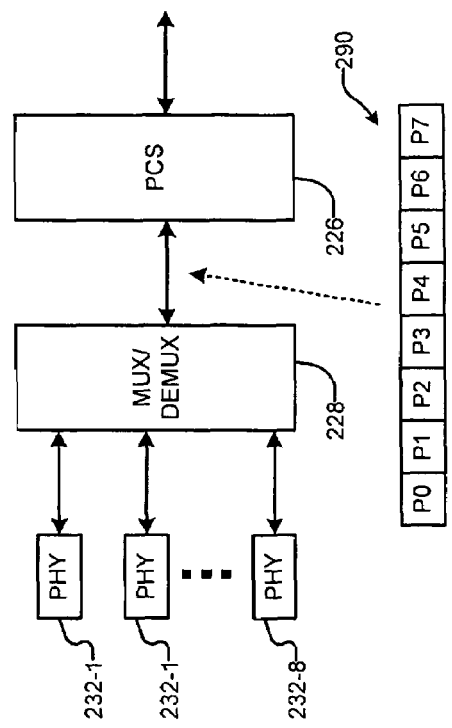

In FIG. 7C, the data stream may be passed on a bit-by-bit basis to the MUX/DEMUX 228. In other words, the 8 (or less) bits are output by the 8 (or less) PHYs 232 to the MUX/DEMUX 228 when an 8/10 bit PCS is used. The MUX/DEMUX 228 multiplexes the bits from the PHYs 232 and outputs an 8 bit stream 290 to the PCS 226. The PCS 226 encodes the 8 bits into 10 bits. This type of PCS coding/decoding limits the maximum number of ports supported to 8. As can be appreciated, 64/66 bit PCS coding/decoding can be used. Up to 64 ports can be supported using the 64/66 PCS coding/decoding as applied by a 10 Gb/s Ethernet PHY if the IDES is used to multiplex 10 1 Gb/s Ethernet ports on a XAUI (10GE) interface. While a one bit per port approach is described above, still other variations are contemplated including but not limited to two bits from each port in a 4 port device using 8/10 bit PCS coding, 16 bits per port in a 4 port device using 64/66 PCS coding, etc. If the number of ports is not an integer divisor of the number of inputs bits of the PCS coding that is used, dummy data bits can be used with some loss of efficiency.

Figure 8:
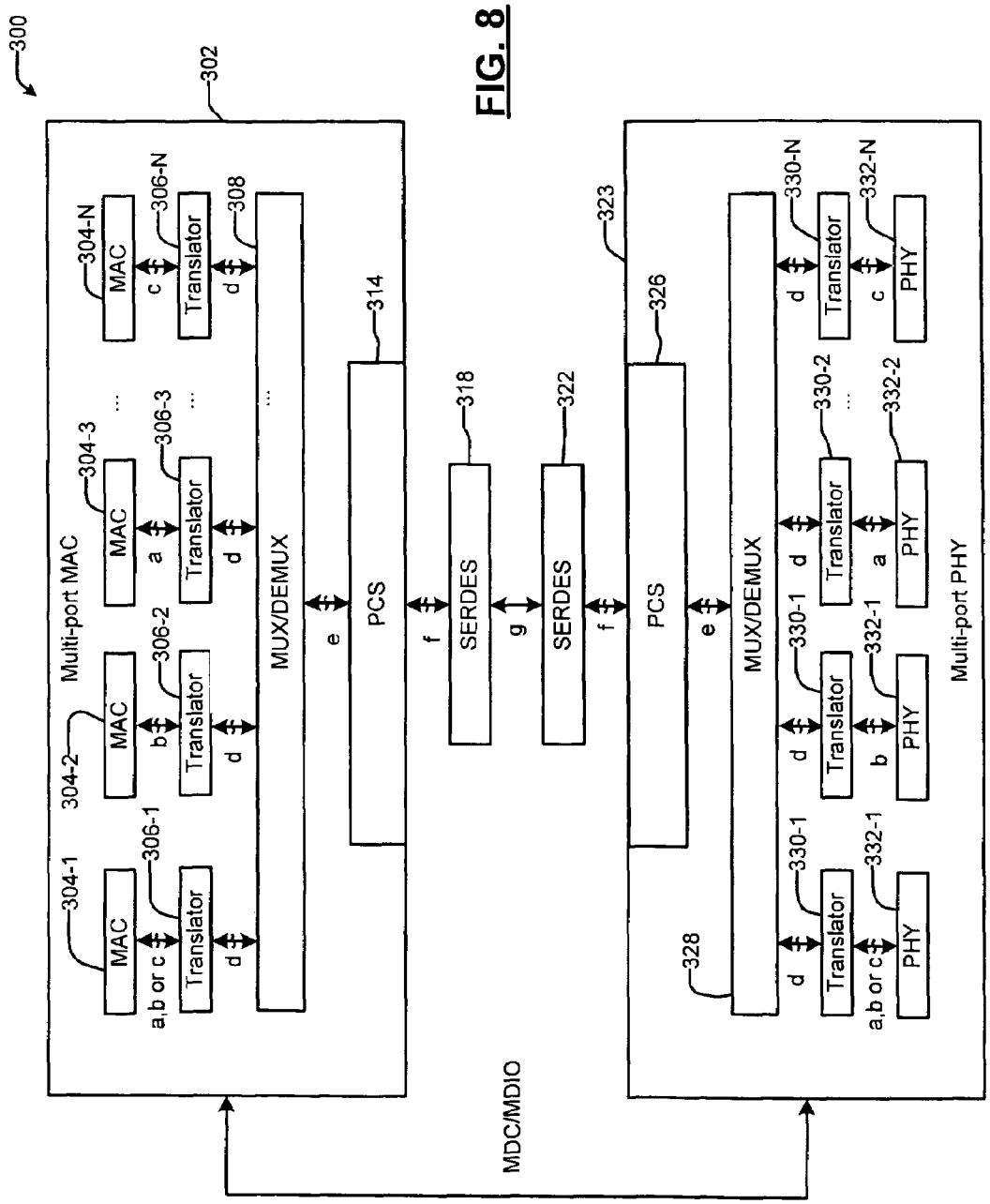
FIG. 8 is a functional block diagram of a first exemplary interface for connecting a device containing a multi-port MAC using a PCS, a MUX/DEMUX and a single SERDES on both ends of the interface.

Referring now to FIG. 8, a network device 300 comprises a multi-port MAC device 302 including N MAC devices 304-1, 304-2, . . . 304-N (collectively MAC devices 304) that operate at a single speed, different speeds and/or multiple speeds. Speed translators such as those described above in conjunction with FIGS. 2-5B or other suitable speed translators are used to accommodate different speeds and/or multiple speeds. MAC devices 304-1, 304-2, . . . and 304-N communicate with speed translators 306-1, 306-2, . . . and 306-N, respectively, which translate the speed of the data stream output by the MAC devices 304 to a highest speed. Alternately, the speed translators 306 may translate the speeds to a speed that is higher than the highest speed.

Outputs of the speed translators 306-1, 306-2, . . . , and 306-N communicate with MUX/DEMUX 308, which multiplexes the data stream. An output of the MUX/DEMUX 308 communicates with a PCS device 314, which provides coding for delineation and scrambling. The PCS device 314 communicates with a first serializer/deserializer (SERDES) 318, which serializes the data stream.

A second SERDES 322 communicates with the first SERDES 218 and with multi-port PHY device 323 that includes a PCS device 326. The PCS device 326 communicates with MUX/DEMUX 328. Outputs of the MUX/DEMUX communicate with speed translators 330-1, 330-2, . . . 330N, respectively, which reduce the speed of the data stream to the original speed for output to the respective PHY devices 332-1, 332-2, . . . and 332-N (collectively PHY devices 332).

On the transmit path, the MAC device 304 outputs a parallel data stream at speed a, b or c. While three speeds are described, additional or fewer speeds may be used. The speed translator 306 translates the speed using the techniques described above to the highest used speed or to a higher speed. For example, d=c, d=10*b, or d=100*a. The MUX/DEMUX 308 multiplexes the data stream with other data streams and outputs a multiplexed data stream at speed e, where e≧N*d. The PCS device 314 performs coding and outputs a coded data stream at speed f, where f>e. The SERDES 318 serializes the coded parallel data steam to generate a serial data stream at speed g, where g≧N*e.

The SERDES 322 deserializes the serial data stream to generate the coded parallel data stream. The PCS device 326 decodes the coded parallel data stream. The MUX/DEMUX 328 demultiplexes an output of the PCS device 326 and outputs data streams at speed d to the translators 330. The translators 330 translate the data to the original speed (a, b or c) for output to the PHY devices 332, which output the data to the medium (not shown).

For example, in one implementation, N=4, a=10 Mb/s, b=100 Mb/s, c=1 Gb/s, d=1 Gb/s, e=4 Gb/s, f=5 Gb/s (PCS 314 uses 8/10 bit encoding), and g=20 Gb/s. As can be appreciated, higher and lower speeds and other types of PCS coding may be implemented. Also, the MAC devices 304 may have a single speed that differs from other MAC devices 304. For example, in FIG. 8, the MAC device 304-2 operates at speed b, the MAC device 304-32 operates at speed a and the MAC device 304-N operates at speed c. As can be appreciated, the translator 306-N may optionally be omitted when c=d. All of the MAC devices 304 may operate at multiple speeds in a manner similar to MAC 304-1, which can operate at speeds a, b or c.

On the receive path, the PHY devices 332 output parallel data streams at speed a, b or c to the translators 330, which translates the speed to speed d. The MUX/DEMUX 328 multiplexes the encoded parallel data stream and outputs a multiplexed parallel data stream. The PCS device 326 encodes the parallel data stream and outputs an encoded parallel data stream at speed f. The SERDES 322 serializes the data stream and transmits a serialized data stream at speed g to the SERDES 318. The SERDES 318 deserializes the serialized data stream and outputs the deserialized data stream to the PCS device 314, which outputs a decoded parallel data stream. The MUX/DEMUX 308 demultiplexes the data stream and outputs data streams to the translators 306, which translate the speed d to speed a, b or c for the MAC devices 304.

Figure 1:
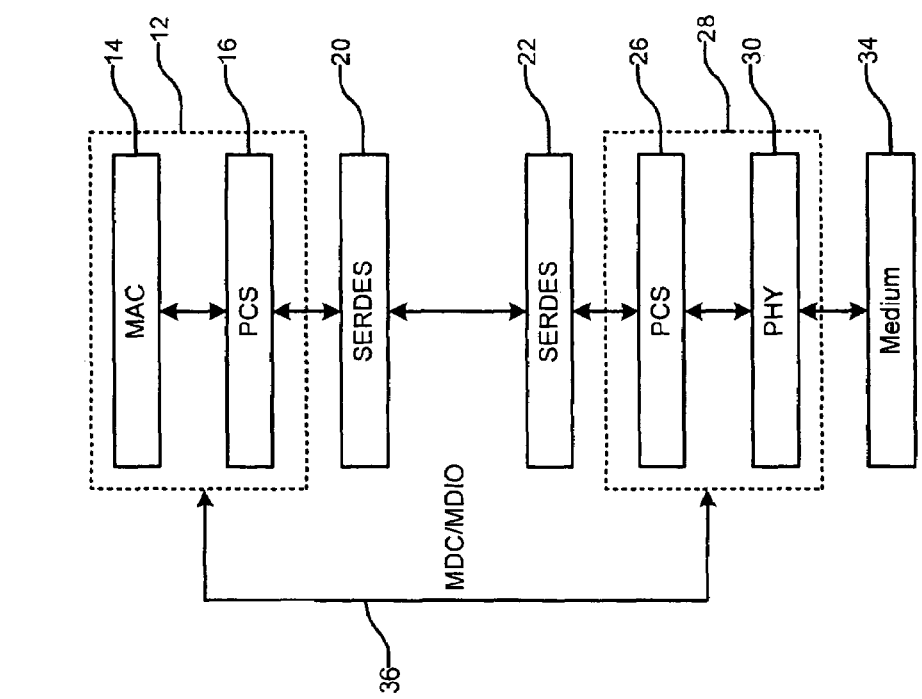
FIG. 1 is a functional block diagram of a network device that includes MAC and PHY devices that are connected by a SERDES according to the prior art.

As can be appreciated, by reducing the number of lines that are required to connect the multi-port MAC device to the multi-port PHY device, routing is simplified. The use of the serial link permits the use of longer connections and reduces synchronization issues. In some implementations of FIGS. 6 and 8, a serial management interface may be provided between the multi-port MAC and PHY devices as shown in FIGS. 1, 2 and 4. For example, the MDC/MDIO interface can be used for, among other things, autonegotiation. While some embodiments have been described in conjunction with 10/100/1000 Mb/s speeds and copper as a medium, other speeds and mediums may be used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network device, comprising:
   a multi-port MAC device that includes N MAC devices and that outputs a port multiplexed and encoded parallel data stream; and
   a first serializer/deserializer (SERDES) that serializes said port multiplexed and encoded parallel data stream from said multi-port MAC device to generate a serialized data stream and that transmits said serialized data stream to a second SERDES of said network device,
   wherein said multi-port MAC device comprises N speed translators that receive parallel data streams from respective ones of said N MAC devices and that selectively output speed translated data streams, where N is an integer greater than 1,
   wherein one of said N speed translators comprises a non-duplicating appender that appends bits to one of said parallel data streams,
   wherein said non-duplicating appender appends W bits to a first one of said parallel data streams, and
   wherein said N speed translators comprise:
      another appender that appends X bits to a second one of said parallel data streams;
      a first duplicator that duplicates output of said non-duplicating appender Y times to generate a first one of said speed translated data streams; and
      a second duplicator that duplicates output of said another appender Z times to generate a second one of said speed translated data streams, where W, X, Y and Z are integers that are each greater than 1 and where Y is less than Z.

2. The network device of claim 1 wherein said multi-port MAC device further comprises a first multiplexer/demultiplexer (MUX/DEMUX) that multiplexes data from and demultiplexes data to said N MAC devices.

3. The network device of claim 2 wherein said multi-port MAC device further comprises a first physical coding sublayer (PCS) device that communicates with said first MUX/DEMUX and said first SERDES and that encodes data from and decodes data to said first MUX/DEMUX.

4. The network device of claim 1 further comprising:
   said second SERDES that communicates with said first SERDES; and
   a multi-port physical layer (PHY) device that includes N PHY devices and that communicates with said second SERDES.

5. The network device of claim 4 wherein said multi-port PHY device includes a second physical coding sublayer (PCS) device that decodes data from and encodes data to said second SERDES.

6. The network device of claim 5 wherein said multi-port PHY device includes a second MUX/DEMUX that communicates with said second PCS device and said N PHY devices and that demultiplexes data from and multiplexes data to said second PCS device.

7. The network device of claim 1 wherein at least one of said N MAC devices operates at multiple speeds.

8. The network device of claim 1 wherein at least one of said N MAC devices operates at a speed that is different than a speed of at least another of said N MAC devices.

9. The network device of claim 1 wherein said multi-port MAC device comprises a first MUX/DEMUX that multiplexes data from and demultiplexes data to said N speed translators.

10. The network device of claim 9 wherein said multi-port MAC device comprises a physical coding sublayer (PCS) device that communicates with said first MUX/DEMUX and said first SERDES and that encodes said data stream from said first MUX/DEMUX and decodes data from said first SERDES.

11. The network device of claim 1 wherein all of said N MAC devices operate at one of 10 Mb/s, 100 Mb/s, 1 Gb/s and 10 Gb/s.

12. The network device of claim 1 wherein said N MAC devices selectively operate at least one of 10 Mb/s, 100 Mb/s, 1 Gb/s and 10 Gb/s.

13. A transmit path of a network device, comprising:
a multi-port MAC device that includes N MAC devices and that outputs a port multiplexed and encoded parallel data stream; and
a serializer that serializes said port multiplexed and encoded parallel data stream from said multi-port MAC device to generate a serialized data stream and that transmits said serialized data stream to a multi-port physical layer (PHY) device of the network device that has N PHY interfaces, wherein said multi-port MAC device comprises N speed translators that receive said parallel data stream from respective ones of said N MAC devices and that selectively output speed translated data streams, where N is an integer greater than 1,
wherein one of said N speed translators comprises a non-duplicating appender that appends bits to one of said parallel data streams,
wherein said non-duplicating appender appends W bits to a first one of said parallel data streams, and
wherein said N speed translators comprise:
another appender that appends X bits to a second one of said parallel data streams;
a first duplicator that duplicates output of said non-duplicating appender Y times to generate a first one of said speed translated data streams; and
a second duplicator that duplicates output of said another appender Z times to generate a second one of said speed translated data streams, where W, X, Y and Z are integers that are each greater than 1 and where Y is less than Z.

14. The transmit path of claim 13 wherein said multi-port MAC device further comprises a multiplexer (MUX) that multiplexes data from said N MAC devices.

15. The transmit path of claim 14 wherein said multi-port MAC device further comprises a first physical coding sublayer (PCS) device that encodes data from said MUX.

16. The transmit path of claim 13 comprising:
a deserializer that communicates with said serializer;
wherein said multi-port PHY device communicates with said deserializer.

17. The transmit path of claim 16 wherein said multi-port PHY device includes a second physical coding sublayer (PCS) device that decodes data from said deserializer.

18. The transmit path of claim 17 wherein said multi-port PHY device includes a demultiplexer that demultiplexes data from said second PCS and that communicates with said N PHY devices.

19. The transmit path of claim 13 wherein at least one of said N MAC devices operates at multiple speeds.

20. The transmit path of claim 13 wherein at least one of said N MAC devices operates at a speed that is different than a speed of at least another of said N MAC devices.

21. The transmit path of claim 13 wherein said multi-port MAC device comprises a multiplexer that multiplexes data from said N speed translators.

22. The transmit path of claim 21 wherein said multi-port MAC device comprises a physical coding sublayer (PCS) device that encodes data from said multiplexer and outputs an encoded data stream to said serializer.

23. The transmit path of claim 12 wherein all of said N MAC devices operate at one of 10 Mb/s, 100 Mb/s, 1 Gb/s and 10 Gb/s.

24. The transmit path of claim 13 wherein said N MAC devices selectively operate at least one of 10 Mb/s, 100 Mb/s, 1 Gb/s and 10 Gb/s.

25. A receive path of a network device comprising:
a multi-port PHY device that includes N PHY devices and that outputs a port multiplexed and encoded parallel data stream; and
a serializer that serializes said port multiplexed and encoded parallel data stream from said multi-port PHY device to generate a serialized data stream and that transmits said serialized data stream to a multi-port medium access control (MAC) device of the network device,
wherein said multi-port PHY device comprises N speed translators that receive parallel data from respective ones of said N PHY devices and that selectively output speed translated data streams,
wherein one of said N speed translators comprises a non-duplicating appender that appends bits to one of said parallel data streams,
wherein said non-duplicating appender appends W bits to a first one of said parallel data streams, and
wherein said N speed translators comprise:
another appender that appends X bits to a second one of said parallel data streams;
a first duplicator that duplicates output of said non-duplicating appender Y times to generate a first one of said speed translated data streams; and
a second duplicator that duplicates output of said another appender Z times to generate a second one of said speed translated data streams, where W, X, Y and Z are integers that are each greater than 1 and where Y is less than Z.

26. The receive path of claim 25 wherein said multi-port PHY device further comprises a multiplexer (MUX) that multiplexes data from said N PHY devices.

27. The receive path of claim 26 wherein said multi-port PHY device further comprises a first physical coding sublayer (PCS) device that encodes data from said MUX and that outputs encoded data to said serializer.

28. The receive path of claim 25 further comprising:
a deserializer that communicates with said serializer;
wherein said multi-port MAC device that includes N MAC interfaces and communicates with said deserializer.

29. The receive path of claim 28 wherein said multi-port MAC device includes a second physical coding sublayer (PCS) device that decodes data from said deserializer.

30. The receive path of claim 29 wherein said multi-port MAC device includes a demultiplexer that demultiplexes data from said second PCS and that outputs said demultiplexed data to said N MAC devices.

31. The receive path of claim 25 wherein at least one of said N PHY devices operates at multiple speeds.

32. The receive path of claim 25 wherein at least one of said N PHY devices operates at a speed that is different than a speed of at least another of said N PHY devices.

33. The receive path of claim wherein said multi-port PHY device comprises a multiplexer that multiplexes data from said N speed translators.

34. The receive path of claim 33 wherein said multi-port PHY device comprises a physical coding sublayer (PCS)

device that encodes said data stream from said multiplexer and outputs an encoded data stream to said serializer.

35. The receive path of claim 25 wherein all of said N PHY devices operate at one of 10 Mb/s, 100 Mb/s, 1 Gb/s and 10 Gb/s.

36. The receive path of claim 25 wherein said N PHY devices selectively operate at least one of 10 Mb/s, 100 Mb/s, 1 Gb/s and 10 Gb/s.

37. A method of operating a transmit path of a network device, comprising:
   providing a multi-port MAC device that includes N MAC devices that generate parallel data streams;
   generating a port multiplexed and encoded parallel data stream from said parallel data streams;
   serializing said port multiplexed and encoded parallel data stream via a first serializer/deserializer (SERDES) to generate a serialized data stream;
   transmitting said serialized data stream to a second SERDES of the network device;
   adjusting a speed of said data output by said N MAC devices to generate speed translated data streams;
   appending bits to one of said parallel data streams using a non-duplicating appender during adjustment of said speed;
   appending W bits to a first one of said parallel data streams using said non-duplicating appender;
   appending X bits to a second one of said parallel data streams using another appender;
   duplicating output of said non-duplicating appender Y times to generate a first one of said speed translated data streams; and
   duplicating output of said another appender Z times to generate a second one of said speed translated data streams, where W, X, Y and Z are integers that are each greater than 1 and where Y is less than Z.

38. The method of claim 37 further comprising multiplexing data from said N MAC devices to generate a multiplexed parallel data stream.

39. The method of claim 38 further comprising encoding said multiplexed parallel data stream to generate said port multiplexed and encoded data stream.

40. The method of claim 37 further comprising:
   deserializing said serialized data stream to generate a deserialized data stream; and
   providing a multi-port physical layer device (PHY) that includes N PHY devices.

41. The method of claim 40 further comprising decoding said deserialize data stream to generate a decoded data stream.

42. The method of claim 41 further comprising demultiplexing said decoded data stream.

43. The method of claim 37 wherein at least one of said N MAC devices operates at multiple speeds.

44. The method of claim 37 wherein at least one of said N MAC devices operates at a speed that is different than a speed of at least another of said N MAC devices.

45. The method of claim 37 further comprising multiplexing said speed translated data streams to generate a multiplexed data stream.

46. The method of claim 45 further comprising encoding said multiplexed data stream and to generate said port multiplexed and encoded data stream.

47. The method of claim 37 wherein all of said N MAC devices operate at one of 10 Mb/s, 100 Mb/s, 1 Gb/s and 10 Gb/s.

48. The method of claim 37 wherein said N MAC devices selectively operate at least one of 10 Mb/s, 100 Mb/s, 1 Gb/s and 10 Gb/s.

49. A method of operating a receive path of a network device comprising:
   providing a multi-port PHY device that includes N PHY devices that generate parallel data streams;
   generating a port multiplexed and encoded parallel data stream from said parallel data streams;
   serializing said port multiplexed and encoded parallel data stream to generate a serialized data stream;
   transmitting said serialized data stream to a multi-port medium access control (MAC) device of the network device;
   selectively translating a speed of said parallel data streams to generate speed translated data streams;
   appending bits to one of said parallel data streams using a non-duplicating appender during adjustment of said speed;
   appending W bits to a first one of said parallel data streams using said non-duplicating appender,
   appending X bits to a second one of said parallel data streams using another appender;
   duplicating output of said non-duplicating appender Y times to generate a first one of said speed translated data streams; and
   duplicating output of said another appender Z times to generate a second one of said speed translated data streams, where W, X, Y and Z are integers that are each greater than 1 and where Y is less than Z.

50. The method of claim 49 further comprising multiplexing said parallel data streams from said N PHY devices to generate a multiplexed data stream.

51. The method of claim 50 further comprising encoding said multiplexed data stream to generate said port multiplexed and encoded data stream.

52. The method of claim 49 further comprising:
   deserializing said serialized data stream to generate a deserialized data stream; and
   providing said multi-port MAC device that includes N MAC devices.

53. The method of claim 52 further comprising decoding said deserialized data stream to generate a decoded data stream.

54. The method of claim 53 further comprising demultiplexing said decoded data stream to generate a demultiplexed data stream that is output to said N MAC devices.

55. The method of claim 49 wherein at least one of said N PHY devices operates at multiple speeds.

56. The method of claim 49 wherein at least one of said N PHY devices operates at a speed that is different than a speed of at least another of said N PHY devices.

57. The method of claim 49 further comprising multiplexing said speed translated data stream to generate a multiplexed data stream.

58. The method of claim 57 further comprising encoding said multiplexed data stream to generate said port multiplexed and encoded data stream.

59. The method of claim 49 wherein all of said N PHY devices operate at one of 10 Mb/s, 100 Mb/s, 1 Gb/s and 10 Gb/s.

60. The method of claim 49 wherein said N PHY devices selectively operate at least one of 10 Mb/s, 100 Mb/s, 1 Gb/s and 10 Gb/s.

61. A network device, comprising:
multi-port MAC means for controlling medium access, for providing N MAC devices and for outputting a port multiplexed and encoded parallel data stream; and
first serializing and deserializing means for serializing said port multiplexed and encoded parallel data stream from said multi-port MAC means to generate a serialized data stream and for transmitting said serialized data stream to a second serializing and deserializing means for communicating and of the network device,
wherein said multi-port MAC means comprises speed translating means for selectively adjusting a speed of said parallel data streams from respective ones of N MAC devices,
wherein one of said speed translating means comprises a non-duplicating appending means for appending bits to one of said parallel data streams,
wherein said non-duplicating appending means appends W bits to a first one of said parallel data streams, and
wherein said speed translating means comprises:
another appending means for appending X bits to a second one of said parallel data streams;
first duplicating means for duplicating output of said non-duplicating appending means Y times to generate a first one of said speed translated data streams; and
second duplicating means for duplicating output of said another appending means Z times to generate a second one of said speed translated data streams, where W, X, Y and Z are integers that are each greater than 1 and where Y is less than Z.

62. The network device of claim 61 wherein said multi-port MAC means further comprises first multiplexing and demultiplexing means for multiplexing data from and demultiplexing data to said N MAC devices.

63. The network device of claim 62 wherein said multi-port MAC means further comprises first coding means that communicates with said first multiplexing and demultiplexing means and said first serializing and deserializing means for encoding data from and decoding data to said first multiplexing and demultiplexing means.

64. The network device of claim 61 further comprising:
said second serializing and deserializing means for serializing and deserializing data and that communicates with said first serializing and deserializing means; and
multi-port PHY means for interfacing with media, for providing N PHY devices and for communicating with said second serializing and deserializing means.

65. The network device of claim 64 wherein said multi-port PHY means includes second coding means for decoding data from and encoding data to said second serializing and deserializing means.

66. The network device of claim 65 wherein said multi-port PHY means includes second multiplexing and demultiplexing means that communicates with said second coding means and said N PHY devices for multiplexing data from and demultiplexing to said second coding means.

67. The network device of claim 61 wherein at least one of N MAC devices operates at multiple speeds.

68. The network device of claim 61 wherein at least one of N MAC devices operates at a speed that is different than a speed of at least another of N MAC devices.

69. The network device of claim 61 wherein said multi-port MAC means comprises first multiplexing and demultiplexing means for multiplexing data from and demultiplexing data to said speed translating means.

70. The network device of claim 69 wherein said multi-port MAC means comprises coding means that communicates with said first multiplexing and demultiplexing means and said first serializing and deserializing means for encoding data from said first multiplexing and demultiplexing means and decoding data from said first serializing and deserializing means.

71. The network device of claim 61 wherein all of N MAC devices operate at one of 10 Mb/s, 100 Mb/s, 1 Gb/s and 10 Gb/s.

72. The network device of claim 61 wherein N MAC devices selectively operate at least one of 10 Mb/s, 100 Mb/s, 1 Gb/s and 10 Gb/s.

73. A transmit path of a network device, comprising:
multi-port MAC means for controlling medium access, for providing N MAC devices that generate parallel data streams and for generating a port multiplexed and encoded parallel data stream; and
serializing means for serializing said port multiplexed and encoded parallel data stream from multi-port MAC means to generate a serialized data stream,
wherein said serializing means transmits said serialized data stream to a multi-port physical layer (PHY) means of the network device for interfacing with media,
wherein said multi-port PHY means has N PHY interfaces,
wherein said multi-port MAC means comprises speed translating means for generating speed translated data streams from said parallel data streams,
wherein said speed translating means comprises non-duplicating appending means for appending bits to one of said parallel data streams,
wherein said non-duplicating appending means appends w bits to a first one of said parallel data streams, and
wherein said speed translating means comprises:
another appending means for appending X bits to a second one of said parallel data streams;
first duplicating means for duplicating output of said non-duplicating appending means Y times to generate a first one of said speed translated data streams; and
second duplicating means for duplicating output of said another appending means Z times to generate a second one of said speed translated data streams, where W, X, Y and Z are integers that are each greater than 1 and where Y is less than Z.

74. The transmit path of claim 73 wherein said multi-port MAC means further comprises multiplexing means for multiplexing data from said N MAC devices.

75. The transmit path of claim 74 wherein said multi-port means further comprises first coding means for encoding data from said multiplexing means.

76. The transmit path of claim 73 comprising:
deserializing means for deserializing data from said serializing means; and
said multi-port PHY means that provides N PHY devices and communicates with said deserializing means.

77. The transmit path of claim 76 wherein said multi-port PHY means includes second coding means for decoding data from said deserializing means.

78. The transmit path of claim 77 wherein said multi-port PHY means includes demultiplexing means for demultiplexing data from said second coding means and that communicates with said N PHY devices.

79. The transmit path of claim 73 wherein at least one of N MAC devices operates at multiple speeds.

80. The transmit path of claim 73 wherein at least one of N MAC devices operates at a speed that is different than a speed of at least another of N MAC devices.

81. The transmit path of claim 73 wherein said multi-port MAC means comprises multiplexing means for multiplexing data from said speed translating means.

82. The transmit path of claim 81 wherein said multi-port MAC means comprises coding means for encoding data from said multiplexing means and for outputting an encoded data stream to said serializing means.

83. The transmit path of claim 73 wherein all of N MAC devices operate at one of 10 Mb/s, 100 Mb/s, 1 Gb/s and 10 Gb/s.

84. The transmit path of claim 73 wherein N MAC devices selectively operate at least one of 10 Mb/s, 100 Mb/s, 1 Gb/s and 10 Gb/s.

85. A receive path of a network device comprising:
multi-port PHY means for interfacing with media, for providing N PHY devices that generate parallel data streams and for generating a port multiplexed and encoded parallel data stream; and
serializing means for serializing said port multiplexed and encoded parallel data stream from said multi-port PHY means to generate a serialized data stream and for transmitting said serialized data stream to a multi-port medium access control (MAC) means of the network device for controlling media access,
wherein said multi-port PHY means comprises speed translating means for selectively adjusting a speed of said parallel data streams from respective ones of said N PHY devices,
wherein said speed translating means comprises an non-duplicating appending means for appending bits to one of said parallel data streams,
wherein said non-duplicating appending means appends W bits to a first one of said parallel data streams, and
wherein said speed translating means comprises:
another appending means for appending X bits to a second one of said parallel data streams;
first duplicating means for duplicating output of said non-duplicating appending means Y times to generate a first one of said speed translated data streams; and
second duplicating means for duplicating output of said another appending means Z times to generate a second one of said speed translated data streams, where W, X, Y and Z are integers that are each greater than 1 and where Y is less than Z.

86. The receive path of claim 85 wherein said multi-port PHY means further comprises multiplexing means for multiplexing said parallel data streams from said N PHY devices.

87. The receive path of claim 86 wherein said multi-port PHY means further comprises first coding means for encoding data from said multiplexing means and for outputting said encoded data to said serializing means.

88. The receive path of claim 82 further comprising:
deserializing means for deserializing data from said serializing means; and
said multi-port MAC means that provides N MAC devices and that communicates with said deserializing means.

89. The receive path of claim 88 wherein said multi-port MAC means includes second coding means for decoding data from said deserializing means.

90. The receive path of claim 89 wherein multi-port MAC means includes demultiplexing means for demultiplexing data from said second coding means and for outputting said demultiplexed data to N MAC devices.

91. The receive path of claim 85 wherein at least one of said N PHY devices operates at multiple speeds.

92. The receive path of claim 85 wherein at least one of said N PHY devices operates at a speed that is different than a speed of at least another of said N PHY devices.

93. The receive path of claim 85 wherein said multi-port PHY means comprises multiplexing means for multiplexing data from said speed translating means.

94. The receive path of claim 93 wherein said multi-port PHY means comprises coding means for encoding data from said multiplexing means and for outputting an encoded data stream to said serializing means.

95. The receive path of claim 85 wherein all of said N PHY devices operate at one of 10 Mb/s, 100 Mb/s, 1 Gb/s and 10 Gb/s.

96. The receive path of claim 85 wherein said N PHY devices selectively operate at least one of 10 Mb/s, 100 Mb/s, 1 Gb/s and 10 Gb/s.

97. The network device of claim 1 wherein said network device comprises at least one of a router, a switch and/or a gateway.

98. The transmit path of claim 13 wherein said network device comprises at least one of a router, a switch and/or a gateway.

99. The receive path of claim 25 wherein said network device comprises at least one of a router, a switch and/or a gateway.

100. The method of claim 37 wherein said network device comprises at least one of a router, a switch and/or a gateway.

101. The method of claim 49 wherein said network device comprises at least one of a router, a switch and/or a gateway.

102. The network device of claim 61 wherein said network device comprises at least one of a router, a switch and/or a gateway.

103. The transmit path of claim 73 wherein said network device comprises at least one of a router, a switch and/or a gateway.

104. The receive path of claim 85 wherein said network device comprises at least one of a router, a switch and/or a gateway.

105. A network device, comprising:
a multi-port PHY device that includes N PHY devices and that outputs a port multiplexed and encoded parallel data stream; and
a first serializer/deserializer (SERDES) that serializes said port multiplexed and encoded parallel data stream from said multi-port PHY device to generate a serialized data stream and that transmits said serialized data stream to a second SERDES of the network device,
wherein said multi-port PHY device comprises N speed translators that receive parallel data from respective ones of said N PHY devices and that selectively output speed translated data streams, and
wherein one of said N speed translators comprises a non-duplicating appender that appends bits to one of said parallel data streams,
wherein said non-duplicating appender appends W bits to a first one of said parallel data streams, and
wherein said N speed translators comprise:
another appender that appends X bits to a second one of said parallel data streams;
a first duplicator that duplicates output of said non-duplicating appender Y times to generate a first one of said speed translated data streams; and
a second duplicator that duplicates output of said another appender Z times to generate a second one of said speed translated data streams, where W, X, Y and Z are integers that are each greater than 1 and where Y is less than Z.

106. The network device of claim 105 wherein said multi-port PHY device further comprises a multiplexer/demultiplexer (MUX/DEMUX) that multiplexes data from and demultiplexes data to said N PHY devices.

107. The network device of claim 106 wherein said multi-port PHY device further comprises a first physical coding sublayer (PCS) device that communicates with said MUX/DEMUX and that decodes data from and encodes data to said first SERDES.

108. The network device of claim 105 further comprising:
said second SERDES that communicates with said first SERDES;
a multi-port medium access control device (MAC) that includes N MAC devices and that communicates with said second SERDES.

109. A network device, comprising:
multi-port PHY means for interfacing with media, for providing N PHY devices and for outputting a port multiplexed and encoded parallel data stream; and
first serializing and deserializing means for serializing said port multiplexed and encoded parallel data stream from said multi-port PHY means to generate a serialized data stream and that transmits said serialized data stream to a second SERDES means for communicating and of the network device,
wherein said multi-port PHY means comprises speed translating means for selectively adjusting a speed of said parallel data streams from respective ones of said N PHY devices, and
wherein said speed translating means comprises non-duplicating appending means for appending bits to one of said parallel data streams,
wherein said non-duplicating appender appends W bits to a first one of said parallel data streams, and
wherein said N speed translators comprise:
another appender that appends X bits to a second one of said parallel data streams;
a first duplicator that duplicates output of said non-duplicating appender Y times to generate a first one of said speed translated data streams; and
a second duplicator that duplicates output of said another appender Z times to generate a second one of said speed translated data streams, where W, X, Y and Z are integers that are each greater than 1 and where Y is less than Z.

110. The network device of claim 109 wherein said multi-port PHY means further comprises first multiplexing and demultiplexing means for multiplexing data from and demultiplexing data to said N PHY devices.

111. The network device of claim 110 wherein said multi-port PHY means further comprises first coding means that communicates with said first multiplexing and demultiplexing means and said first serializing and deserializing means for encoding data from and decoding data to said first multiplexing and demultiplexing means.

112. The network device of claim 109 further comprising:
second serializing and deserializing means for serializing and deserializing data and that communicates with said first serializing and deserializing means; and
said multi-port MAC means that provides N MAC devices and that communicates with said second serializing and deserializing means.

113. The network device of claim 2 wherein said MUX/DEMUX adds a port delimiter to data from said N MAC devices.

114. The network device of claim 3 wherein said first PCS device also encodes port delimiting data when encoding data from said MUX/DEMUX.

115. The transmit path of claim 14 wherein said MUX adds a port delimiter to data from said N MAC devices.

116. The transmit path of claim 15 wherein said first PCS device also encodes port delimiting data when encoding data from said MUX.

117. The receive path of claim 26 wherein said MUX adds a port delimiter to data from said N PHY devices.

118. The receive path of claim 27 wherein said first PCS device also encodes port delimiting data when encoding data from said MUX.

119. The method of claim 38 further comprising adding a port delimiter to data from said N MAC devices.

120. The method of claim 39 further comprising encoding port delimiting data during said encoding step.

121. The method of claim 50 further comprising adding a port delimiter to data from said N PHY devices.

122. The method of claim 51 further comprising encoding port delimiting data during said encoding step.

123. The network device of claim 61 wherein said first multiplexing and demultiplexing means adds a port delimiter to data from said N MAC devices.

124. The network device of claim 63 wherein said first coding means also encodes port delimiting data when encoding data from said first multiplexing and demultiplexing means.

125. The transmit path of claim 74 wherein said multiplexing means adds a port delimiter to data from said N MAC devices.

126. The transmit path of claim 75 wherein said first coding means also encodes port delimiting data when encoding data from said multiplexing means.

127. The receive path of claim 86 wherein said multiplexing means adds a port delimiter to data from said N PHY devices.

128. The receive path of claim 87 wherein said first coding means also encodes port delimiting data when encoding data from said multiplexing means.

129. The network device of claim 106 wherein said MUX/DEMUX adds a port delimiter to data from said N PHY devices.

130. The network device of claim 107 wherein said first PCS device also encodes port delimiting data when encoding data from said MUX/DEMUX.

131. The network device of claim 110 wherein said first multiplexing and demultiplexing means adds a port delimiter to data from said PHY devices.

132. The network device of claim 111 wherein said first coding means also encodes port delimiting data when encoding data from said first multiplexing and demultiplexing means.

133. The network device of claim 1 wherein said parallel data streams have N respective speeds.

134. The network device of claim 133 wherein said speed translated data streams have a same common speed.

135. The network device of claim 134 wherein said common speed is different than speeds of said parallel data streams.

136. The network device of claim 1 wherein a first one of said N speed translators translates a first speed of a first one of said parallel data streams to a second speed, and wherein a second one of said N speed translators translates a third speed of a second one of said parallel data streams to said second speed.

137. The network device of claim 136 wherein the first speed is equal to the second speed, and
wherein the third speed is different than the second speed.

138. The network device of claim 136 wherein the first speed is different than the second speed, and
wherein the third speed is different than the first and second speeds.

139. The network device of claim 136 wherein said multi-port MAC device comprises a MUX/DEMUX that multiplexes said speed translated data streams to generate a multiplexed data stream at a fourth speed that is greater than or equal to N multiplied by said second speed.

140. The network device of claim 1 wherein said appended bits are placed in least significant bit positions of said one of said parallel data streams.

141. The network device of claim 1 wherein said appended bits are placed in most significant bit positions of said one of said parallel data streams.

142. The transmit path of claim 13 wherein said network device receives an input data stream via said multi-port MAC device,
wherein said multi-port MAC device outputs said port multiplexed and encoded parallel data stream based on said input data stream, and
wherein said serializer transmits said serialized data stream to a deserializer of said multi-port PHY device.

143. The network device of claim 1 wherein said N speed translators append said bits to said one of said parallel data streams to adjust a data rate of said one of said parallel data streams to match a data rate of another one of said parallel data streams.

* * * * *